United States Patent
Bao et al.

(10) Patent No.: US 9,804,783 B1
(45) Date of Patent: Oct. 31, 2017

(54) HIERARCHICAL HOST CONTROLLER FOR SSD DEVICE

(71) Applicant: SK hynix memory solutions inc., San Jose, CA (US)

(72) Inventors: Shengkun Bao, San Jose, CA (US); Wing Hui, San Jose, CA (US); Ananthanarayanan Nagarajan, Palo Alto, CA (US); Kin Ming Chan, Fremont, CA (US)

(73) Assignee: SK Hynix Memory Solutions Inc., San Jose, CA (US)

(*) Notice: Subject to any disclaimer, the term of this patent is extended or adjusted under 35 U.S.C. 154(b) by 58 days.

(21) Appl. No.: 14/881,052

(22) Filed: Oct. 12, 2015

Related U.S. Application Data

(60) Provisional application No. 62/065,447, filed on Oct. 17, 2014.

(51) Int. Cl.
*G06F 12/00* (2006.01)
*G06F 3/06* (2006.01)

(52) U.S. Cl.
CPC ............ *G06F 3/061* (2013.01); *G06F 3/0635* (2013.01); *G06F 3/0659* (2013.01); *G06F 3/0685* (2013.01)

(58) Field of Classification Search
CPC ...... G06F 3/0659; G06F 3/061; G06F 3/0685; G06F 3/0635
USPC ........................................................ 711/112
See application file for complete search history.

(56) References Cited

U.S. PATENT DOCUMENTS

| | | | |
|---|---|---|---|
| 9,021,178 B2 * | 4/2015 | Guda | G06F 3/061 711/103 |
| 2013/0339551 A1 * | 12/2013 | Flanagan | G06F 13/4022 710/5 |

* cited by examiner

*Primary Examiner* — Jasmine Song
(74) *Attorney, Agent, or Firm* — IP & T Group LLP

(57) ABSTRACT

A command is received from a host. It is determined which paths in a plurality of paths are enabled. The type of command and the length associated with the command, if applicable, are determined. A path to use to perform the command is selected from the plurality of paths based at least in part on (1) which paths are determined to be enabled and one or more of the following (2a) the type of the command or (2b) the length associated with the command. The selected path is used to perform the command.

14 Claims, 6 Drawing Sheets

← 300

| Command Type = Administrative | Command Type = I/O | Command Type = I/O |
|---|---|---|
| Length = N/A | Length > Threshold | Length ≤ Threshold |
| Firmware Path | Middleware Path | Hardware Path |

Example Path Selection When 3 Paths are Enabled

← 302

| Command Type = Administrative | Command Type = I/O |
|---|---|
| Length = N/A | Length = N/A |
| Firmware Path | Middleware Path |

Example Path Selection When 2 Paths are Enabled

← 304

| Command Type = N/A |
|---|
| Length = N/A |
| Firmware Path |

Example Path Selection When 1 Path is Enabled

FIG. 3

HIERARCHICAL HOST CONTROLLER FOR SSD DEVICE

CROSS REFERENCE TO OTHER APPLICATIONS

This application claims priority to U.S. Provisional Patent Application No. 62/065,447 entitled HIERARCHICAL HOST CONTROLLER FOR SSD DEVICE filed Oct. 17, 2014 which is incorporated herein by reference for all purposes.

BACKGROUND OF THE INVENTION

The capacity of solid state storage drives (e.g., NAND) is growing rapidly, as is the introduction of new host interfaces (e.g., PCIe) which also support faster data transfers. This puts a tremendous amount of pressure on the host controller, which sits between the host and the storage controller (e.g., a NAND controller). New host controllers which offer a variety of attractive features (e.g., high throughput, low latency and/or flexibility) would be desirable.

BRIEF DESCRIPTION OF THE DRAWINGS

Various embodiments of the invention are disclosed in the following detailed description and the accompanying drawings.

FIG. 3 is a diagram illustrating an embodiment of path selection tables.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
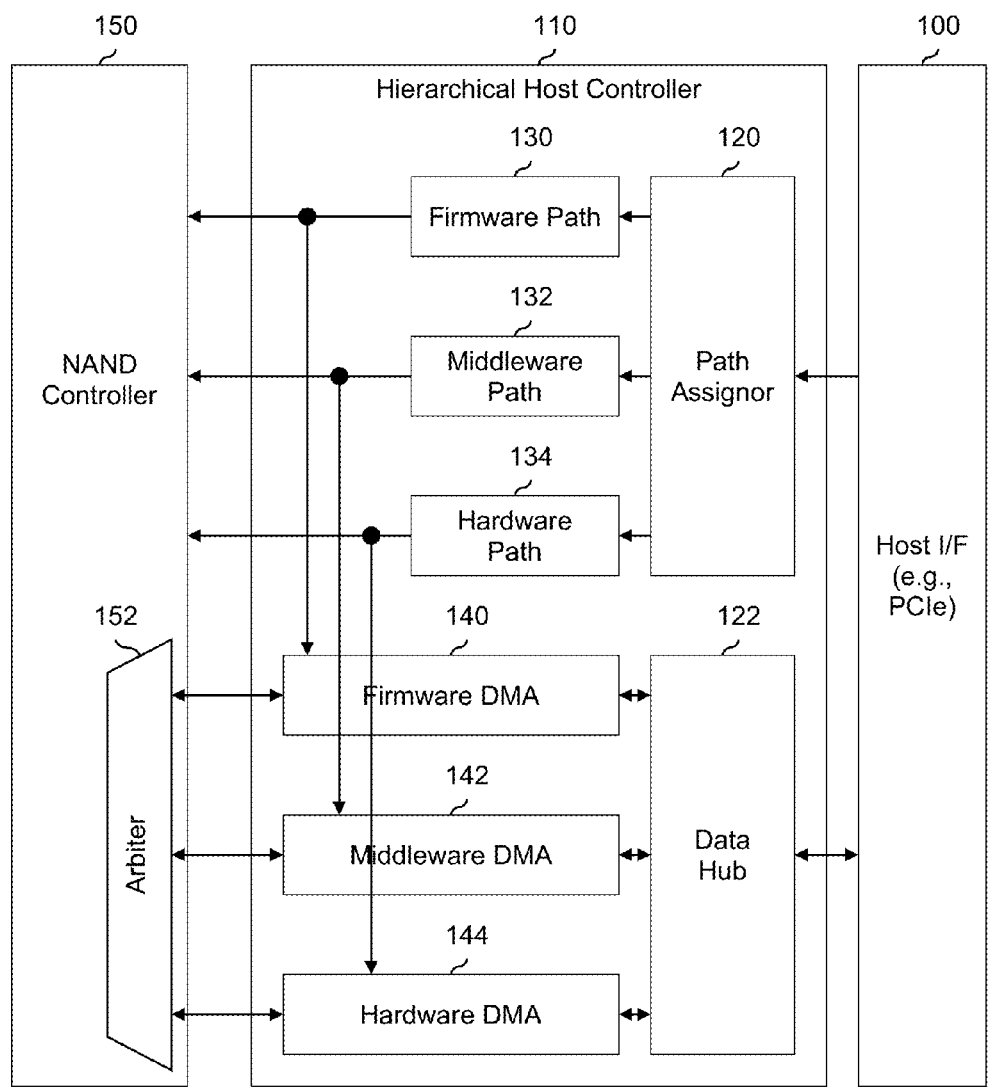
FIG. 1 is a diagram illustrating an embodiment of a hierarchical host controller.

FIG. 1 is a diagram illustrating an embodiment of a hierarchical host controller. In the example shown, hierarchical host controller 110 sits between NAND controller 150 (which in turn provides access to NAND storage, not shown) and host interface 100. In this example, the host interface is a PCIe interface and is the source from which host commands or instructions originate (e.g., a host instruction to read NAND storage beyond NAND controller 150, a host instruction to write to the NAND storage, etc.).

Hierarchical host controller 110 includes a plurality of paths with which host commands from host interface 100 are processed. In this example, hierarchical host controller 110 includes full feature set, soft-coded path 130, reduced feature set, soft-coded path 132 (e.g., which has a reduced set of operations or logic compared to path 130), and hard-coded path 134. Naturally, having three paths is merely exemplary and is not intended to be limiting. For brevity, full feature set, soft-coded path 130 is referred to herein as a firmware path; reduced feature set, soft-coded path 132 is referred to as a middleware path; hard-coded path 134 is referred to as a hardware path.

In this example, hardware path 134 is completely implemented in hardware, for example using specifically-coded logic implemented as an application-specific integrated circuit (ASIC) or a field-programmable gate array (FPGA). In some examples described herein, hardware path 134 is only able to process some host commands. For example, host commands may have two types: I/O commands (e.g., to read from NAND storage or write to NAND storage) versus administrative commands (e.g., to change some configuration setting, to obtain some system state or status information, etc.). In some examples described herein, hardware path 134 is only able to process I/O commands, and only basic or simple I/O commands at that, for example that do not require encryption support, address or name-space checking, and/or calculation of address "jumps" when data is stored non-contiguously.

Middleware path 132, in this example at least, is implemented using firmware which is a reduced set of operations or instructions compared to that of firmware path 130. In examples described herein, the firmware with which middleware path 132 is implemented focuses on I/O commands, such as reading from or writing to NAND storage. Some I/O-related operations (such as encryption-related operations, address or name-space checking, and/or calculation of address "jumps" when data is stored non-contiguously) which are not are supported by hardware path 134 are supported by middleware path 132. In some examples described herein, middleware path 132 can handle all I/O operations, including those which hardware path 134 cannot handle.

Firmware path 130, in this example at least, is also implemented in firmware but includes a complete or unabridged version of the firmware. For example, firmware path 130 may be able to handle host administrative commands, in addition to host I/O commands (where middleware 132 is only able to handle the latter and cannot handle the former). Firmware path 130 may also have operations related to interrupt handling, and error or exception handling which middleware 132 does not include. In examples described herein, firmware path 134 is able to handle all host commands, includes all host I/O commands and all host administrative commands.

Hierarchical host controller 110 is referred to as such because paths 130, 132, and 134 have a hierarchical relationship with one another. Middleware path 132 is able to handle all of the host I/O commands that hardware path 134 is able to handle, plus the remaining host I/O commands which hardware path 134 is not able to handle. Put another way, middleware path 132 supports a superset of the host I/O commands supported by hardware path 134. Similarly, firmware path 130 is able to handle all of the host I/O commands that middleware path 132 is able to handle, plus all of the host administrative commands. If, for any reason, a given path cannot process a particular command, the command may be passed up to the next enabled path in the hierarchy (e.g., from hardware path 134 to middleware path 132, or from middleware path 132 to firmware path 130, assuming that all three paths are on).

In some embodiments, firmware path 130 and middleware path 132 operate on different (e.g., embedded or micro) processors. For example, because middleware path 132 has a reduced set of instructions or operations which are supported compared to firmware path 130, the processor on which middleware path 132 runs may be a smaller or less powerful processor than the processor on which firmware path 130 runs.

Each of paths 130, 132, and 134 has a corresponding direct memory access (DMA) connection. For example, firmware path 130 corresponds to firmware DMA 140, middleware path 132 corresponds to middleware DMA 142, and hardware path 134 corresponds to hardware DMA 144. Data hub 122 passes the data (e.g., write data sent down from host controller 100 or read data being passed up to host controller 100) between the appropriate DMA and host interface 100. Correspondingly, NAND controller 150 includes an arbiter (152) between soft-coded DMA 140, combination DMA 142, and hard-coded DMA 144 to manage any competing accesses.

As will be described in more detail below, path assignor 120 forwards or otherwise assigns a host command to a particular path based (at least in part) on the type of command (e.g., I/O versus administrative) and/or the length of the command (e.g., whether the read or write is a long, sequential one or a short, random one). Some path selection examples are described in more detail below.

If desired, hard-coded path 134 and/or combination path 132 may be turned off (e.g., because soft-coded path 130 is able to handle all of the host commands coming from host interface 100). Naturally, this affects which paths are available to handle host commands and path assignor 120 accordingly keeps track of which paths are enabled. Some examples of this are described in more detail below.

The following figure shows an example of a process for processing a host command using a hierarchical host controller.

Figure 2:
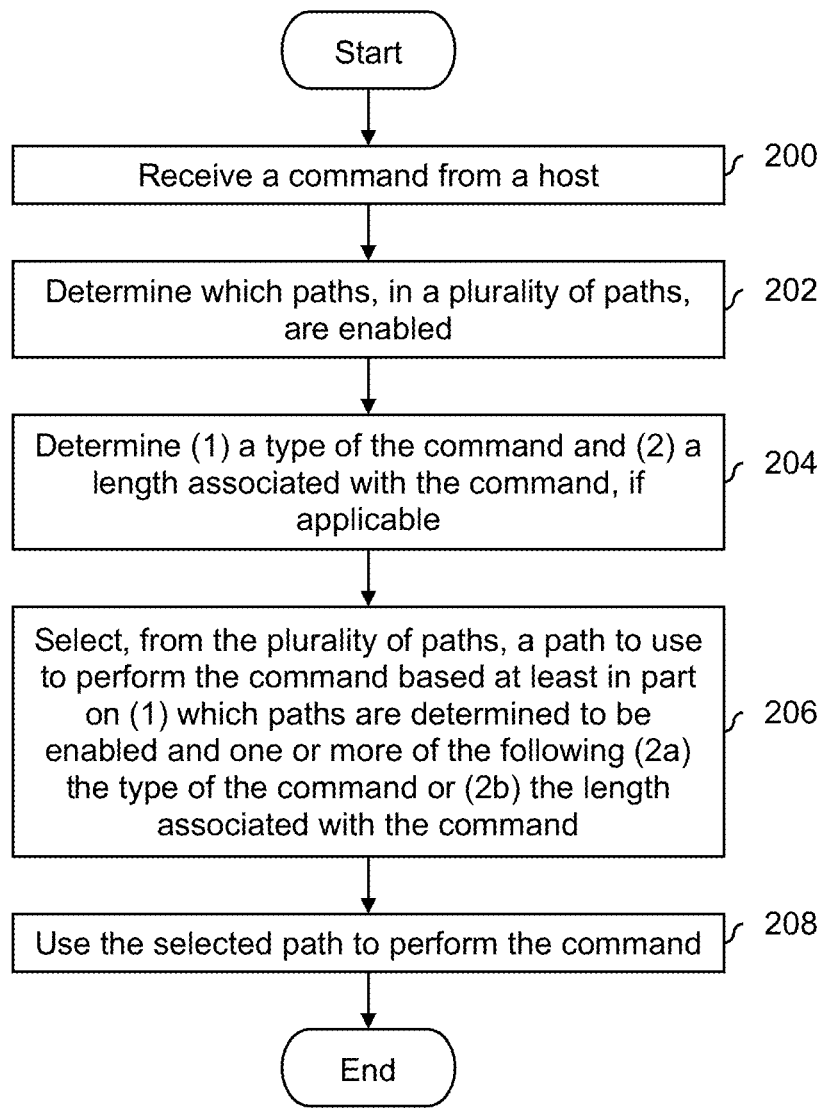
FIG. 2 is a flowchart illustrating an embodiment of a process for processing a host command using a hierarchical host controller.

FIG. 2 is a flowchart illustrating an embodiment of a process for processing a host command using a hierarchical host controller. For example, the process may be performed by hierarchical host controller 110 in FIG. 1 and the process may be performed on a host command received from host interface 100.

At 200, a command is received from a host. For example, path assignor 120 may receive a host command from host interface 100 in FIG. 1.

At 202, the process determines which paths, in a plurality of paths, are enabled. For example, middleware path 132 in FIG. 1 may be off and/or hardware path 134 may be off. In some examples described herein, a firmware path is always on because it is the only path which is capable of processing all host commands (e.g., all I/O commands and all administrative commands) and therefore should be on at all times.

At 204, the process determines (1) a type of the command and (2) a length associated with the command, if applicable. For example, the command type may be either I/O or administrative. The length associated with the command relates to the amount of data or range of addresses being read or written, and implies that the command is an I/O type of command. That is, there may be no concept of length with a host administrative command and therefore a path assignor would not use length in deciding which path to send a command to when the command is an administrative command.

At 206, a path to use to perform the command is selected from the plurality of paths based at least in part on (1) which paths are determined to be enabled and one or more of the following (2a) the type of the command or (2b) the length associated with the command. As described above, if the command is an administrative type of command, then there is no concept of length and therefore that property cannot be used. In some embodiments, short I/O commands (e.g., reading from or write to a certain number of addresses or amount of data which is less than a certain threshold) are sent to the hardware path and longer I/O commands (e.g., having a length longer than the threshold) are sent to the middleware path. This may be because longer commands have a higher likelihood of requiring a feature or operation which the hardware path does not support (e.g., having to calculate an address jump when data is not stored contiguously in host memory).

At 208, the selected path is used to perform the command. For example, this may include having data hub 122 in FIG. 1 send read data from the appropriate DMA (e.g., corresponding the selected one of paths 130, 132, or 134) to host interface 100, or having data hub 122 send write data from host interface 100 to the appropriate DMA.

The following figure shows some exemplary path selection tables which may be used at step 206. In some of the examples described below, a hardware path and/or a middleware path are turned off.

FIG. 3 is a diagram illustrating an embodiment of path selection tables. In the example shown, table 300 shows an example of path selection logic used by path assignor 120 in FIG. 1 when firmware path 130, middleware path 132, and hardware path 134 are all on. Table 302 shows an example of path selection logic when only the firmware path and middleware path are on. Table 304 shows an example of path selection logic when only the firmware path is on. In some embodiments, path assignor 120 in FIG. 1 uses these tables to perform step 206 in FIG. 2.

In the example of table 300, when all three paths are enabled, all host administrative commands are send to the firmware path. Host I/O commands with a length that is greater than a threshold are sent to the middleware path. Host I/O commands with a length that is less than the threshold are sent to the hardware path. The threshold value may be set to a value such that the likelihood of host I/O commands that are sent to the hardware path using that threshold are unlikely to be rejected by the hardware path due to an unsupported operation. For example, the likelihood that an address jump needs to be calculated for a short, random read or write is fairly low since it may be relatively easy to find contiguous memory space in host memory in which to fit a small amount of data (e.g., which was read from NAND storage or is intended to be written to NAND storage). For long, sequential reads or write, it might be harder to find contiguous memory space in host memory and therefore it may be faster and/or more desirable to send those commands directly to a middleware path.

In the example of table 302, when only the firmware path and the middleware path are enabled, the path assignment depends upon the command type. All host administrative commands are sent to the firmware path and all host I/O commands are sent to the middleware path.

Alternatively, some of the longest host I/O commands may be sent to a firmware path instead of a middleware path, if desired. This may depend upon desired performance times (e.g., for host I/O commands of certain lengths compared to other lengths) and/or the traffic patterns experienced by the system (e.g., if there is diversity in the lengths of the host I/O commands and the lengths are predictable, then the environment may be more amenable to sending the longest host I/O commands to the firmware path and the shorter host I/O commands to the middleware path). In some embodiments, a first threshold is used when all three paths are enabled (see, e.g., table 300) and a second threshold is used to divide host I/O commands between a firmware path and a middleware path when only the firmware path and the middleware path are enabled.

For completeness, table 304 shows the path assignment when only the firmware path is enabled. Naturally, all host commands (including I/O and administrative commands) are sent to the firmware path.

The following figure shows an example of an address jump calculation which (in some embodiments) a firmware path is not be able to do but a middleware path is able to do.

Figure 4:
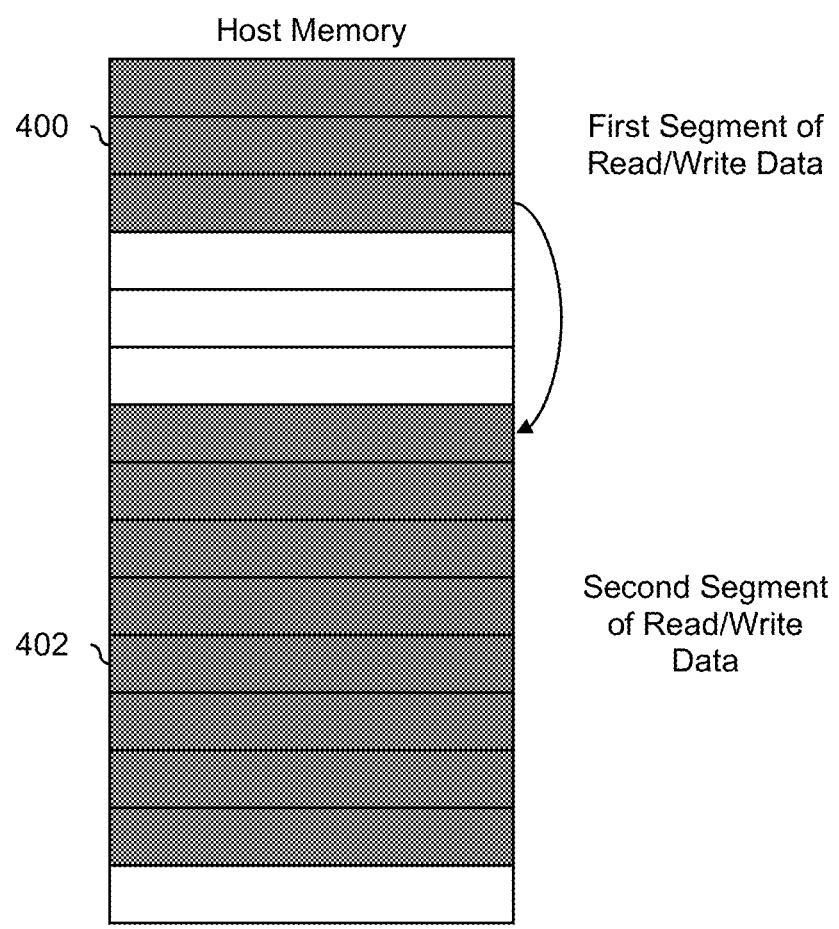
FIG. 4 is a diagram illustrating an embodiment of an address jump in host memory.

FIG. 4 is a diagram illustrating an embodiment of an address jump in host memory. In the example shown, there is some data in host memory which is segmented into two parts: first segment 400 and second segment 402. The data (shaded) may be read data that is written to the host memory in response to a host read command, or may be write data that is retrieved from host memory in response to a host write command. In either case, a contiguous, uninterrupted space for the data could not be found within the host memory and therefore the data was segmented into two segments. As such, there is a "jump" between segments 400 and 402.

In the example of FIG. 1, hardware path 134 supports fairly basic or straightforward host I/O operations. One of the operations which hardware path 134 does not support is the calculation of the address of the beginning of second segment 402 (e.g., which depends upon the beginning of first segment 400, the length of first segment 400, and the length of the gap between segments 400 and 402).

If hardware path 134 in FIG. 1 begins processing a host I/O command which requires such a calculation, the host I/O command may be sent up to the next path in the hierarchy (e.g., middleware path 132) because hardware path 134 will not be able to perform the calculation. In some embodiments, a middleware path support calculation of an address jump because the protocol for it may change over time and/or it may be desirable to soft-code that operation in case it there is a bug in the code. If it were instead hard-coded, then any bugs or protocol changes could not be easily and/or inexpensively addressed.

The following figure shows other example operations which a firmware path in some embodiments does not support, but which a middleware path does support.

Figure 5:
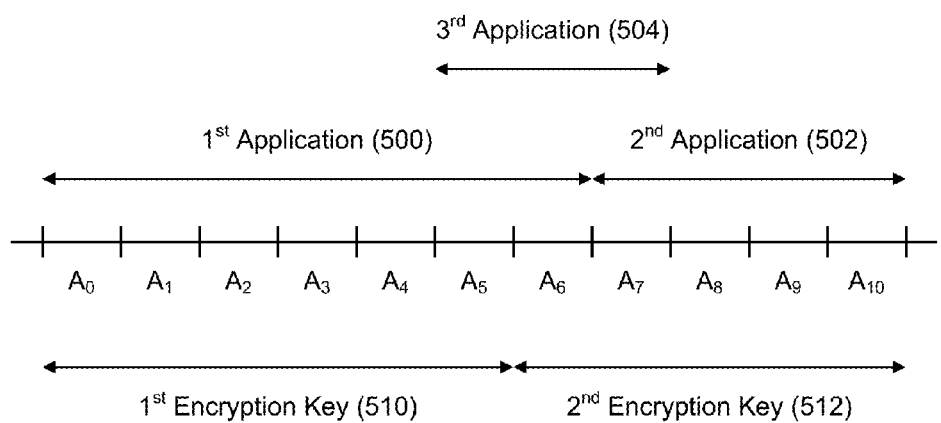
FIG. 5 is a diagram illustrating an embodiment of name-space checking and encryption.

FIG. 5 is a diagram illustrating an embodiment of namespace checking and encryption. In the example shown, there is a range of addresses: $A_0$-$A_{10}$. There are three applications in this example, each of which is permitted to access (e.g., read from and write to) a particular address range. A first application (500) is permitted to access addresses in the range of $A_0$-$A_6$. A second application (502) is permitted to access addresses in the range of $A_7$-$A_{10}$. A third application (504) is permitted to access addresses in the range of $A_5$-$A_7$.

In some embodiments, part of processing a host I/O command may include name-space checking. That is, the path which processes the host I/O command may have to check that the requested read or write address is within a range that the requesting application is permitted to accesses. If the second application (502), for example, had a write command to addresses $A_9$, that would be permitted. However, if the third application (504) tried to write to addresses $A_9$, that would not be permitted. In some embodiments, a firmware path does not perform name-space checking but a middleware path does (e.g., because name-space checking may be protocol dependent and therefore it may be desirable to soft-code that operation in case there is a bug in the design and/or the protocol associated with it changes).

In some embodiments, part of processing a host I/O command may include selection of an appropriate encryption key and applying that encryption key to the data (e.g., as part of an encryption or decryption process). For example, a first encryption key (510) is associated with addresses in the range of $A_0$-$A_5$ and is used to encrypt or decrypt data stored therein. However, addresses in the range of $A_6$-$A_{10}$ use a second encryption key to encrypt or decrypt data. In some embodiments, a firmware path is not able to select an appropriate encryption key and apply that encryption key to the read or write data (e.g., for decryption or encryption, respectively). However, a middleware path may be capable of performing encryption-related operations such as those described above.

As described above, a path may send a host command up to the next path in the hierarchy if it is unable to perform the host command. The following figure gives a more formal description of this.

Figure 6:
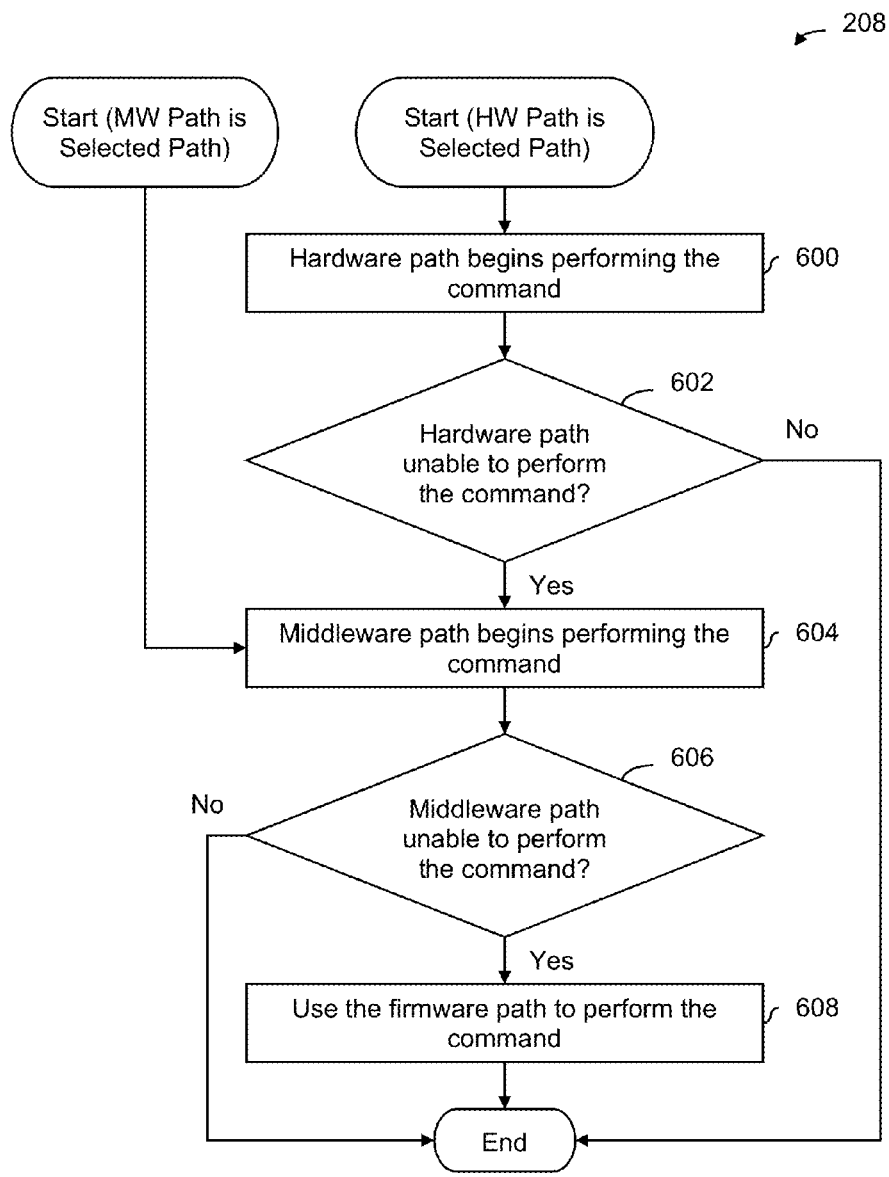
FIG. 6 is a flowchart illustrating an embodiment of a process for passing a host command up to a higher path in a hierarchical host controller.

FIG. 6 is a flowchart illustrating an embodiment of a process for passing a host command up to a higher path in a hierarchical host controller. In some embodiments, FIG. 6 is performed as part of step 208 in FIG. 2. In this example, the process may begin at either step 600 if the hardware path is the selected path or at step 604 if the middleware path is the selected path. FIG. 6 corresponds to the example of FIG. 1, where a hierarchical host controller includes a firmware path, a middleware path, and a hardware path (in hierarchical order from highest to lowest).

At 600, the hardware path begins performing the command. At 602, it is determined if the hardware path is unable to perform the command. For example, FIGS. 4 and 5 give some examples of operations which may be required by a host command and which some hardware paths cannot perform.

If it is determined at 602 that the hardware path can perform the command, then the process ends. That is, the hardware path completes the operation(s) associated with the host command and there is no need to send the host command up to a next path in a hierarchical host controller.

If, however, it is determined at 602 that the hardware path is unable to perform the command, middleware path begins performing the command at 604. At 606, it is determined if the middleware path is unable to perform the command. If it is determined at 606 that the middleware path is able to perform the command, the process ends (e.g., without the host command being sent up to the next path in the hierarchy, which would be the firmware path).

If it is determined at 606 that the middleware path is unable to perform the command, the firmware path is used to perform the command at 608. As described above, the firmware path includes the full feature set and so all host I/O and administrative commands are able to be processed by the firmware path.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a plurality of paths, wherein the plurality of paths is categorized at least by operations that the plurality of paths is eligible to handle, the plurality of paths includes one or more of the following: (1) a full feature set, soft-coded path, (2) a reduced feature set, soft-coded path, or (3) a hard-coded path; and
   a path assignor configured to:
   receive a command from a host;
   determine which paths, in the plurality of paths, are eligible to handle the command based on at least a part of;
   (1) operation of the command or (2) a length associated with the command, if applicable;
   select, from the plurality of paths, a path to use to perform the command based at least in part on (1) which paths are determined to be enabled and one or more of the following (2a) the operation of the command or (2b) the length associated with the command; and
   use the selected path to perform the command.

2. The system recited in claim 1, wherein the system includes a semiconductor device, including one or more of the following: an application-specific integrated circuit (ASIC) or a field-programmable gate array (FPGA).

3. The system recited in claim 1, wherein:
   the full feature set, soft-coded path includes a first set of firmware configured to run on a first embedded processor;
   the reduced feature set, soft-coded path includes a second set of firmware configured to run on a second embedded processor; and
   the hard-coded path includes a semiconductor device, including one or more of the following: an application-specific integrated circuit (ASIC) or a field-programmable gate array (FPGA).

4. The system recited in claim 3, wherein selecting the path includes in the event (1) the full feature set, soft-coded path, (2) the reduced feature set, soft-coded path, and (3) the hard-coded path are enabled:
   in the event the command is an administrative type of command, select the full feature set, soft-coded path;
   in the event the command is an I/O type of command and the length associated with the command is less than a threshold, select the reduced feature set, soft-coded path; and
   in the event the command is an I/O type of command and the length associated with the command is greater than a threshold, select the hard-coded path.

5. The system recited in claim 4, wherein selecting the path includes in the event (1) the full feature set, soft-coded path and (2) the reduced feature set, soft-coded path are enabled and the hard-coded path is not enabled:
   in the event the command is an administrative type of command, select the full feature set, soft-coded path; and
   in the event the command is an I/O type of command, select the reduced feature set, soft-coded path.

6. A method, comprising:
   receiving a command from a host;
   determining which paths, in a plurality of paths, are enabled, wherein the plurality of paths is categorized at least by operations that the plurality of paths is eligible to handle, the plurality of paths includes one or more of the following: (1) a full feature set, soft-coded path, (2) a reduced feature set, soft-coded path, or (3) a hard-coded path;
   determining (1) operation of the command or (2) a length associated with the command, if applicable;
   selecting, from the plurality of paths, a path to use to perform the command based at least in part on (1) which paths are determined to be enabled and one or more of the following (2a) the operation of the command or (2b) the length associated with the command; and
   using the selected path to perform the command.

7. The method recited in claim 6, wherein the method is performed by a semiconductor device, including one or more of the following: an application-specific integrated circuit (ASIC) or a field-programmable gate array (FPGA).

8. The method recited in claim 6, wherein:
   the full feature set, soft-coded path includes a first set of firmware configured to run on a first embedded processor;
   the reduced feature set, soft-coded path includes a second set of firmware configured to run on a second embedded processor; and
   the hard-coded path includes a semiconductor device, including one or more of the following: an application-specific integrated circuit (ASIC) or a field-programmable gate array (FPGA).

9. The method recited in claim 8, wherein selecting the path includes in the event (1) the full feature set, soft-coded path, (2) the reduced feature set, soft-coded path, and (3) the hard-coded path are enabled:
   in the event the command is an administrative type of command, select the full feature set, soft-coded path;
   in the event the command is an I/O type of command and the length associated with the command is less than a threshold, select the reduced feature set, soft-coded path; and
   in the event the command is an I/O type of command and the length associated with the command is greater than a threshold, select the hard-coded path.

10. The method recited in claim 9, wherein selecting the path includes in the event (1) the full feature set, soft-coded path and (2) the reduced feature set, soft-coded path are enabled and the hard-coded path is not enabled:
    in the event the command is an administrative type of command, select the full feature set, soft-coded path; and
    in the event the command is an I/O type of command, select the reduced feature set, soft-coded path.

11. A computer program product, the computer program product being embodied in a non-transitory computer readable storage medium and comprising computer instructions for:
  receiving a command from a host;
  determining which paths, in a plurality of paths, are enabled, wherein the plurality of paths is categorized at least by operations that the plurality of paths is eligible to handle, the plurality of paths includes one or more of the following: (1) a full feature set, soft-coded path, (2) a reduced feature set, soft-coded path, or (3) a hard-coded path;
  determining (1) operation of the command or (2) a length associated with the command, if applicable;
  selecting, from the plurality of paths, a path to use to perform the command based at least in part on (1) which paths are determined to be enabled and one or more of the following (2a) the operation of the command or (2b) the length associated with the command; and
  using the selected path to perform the command.

12. The computer program product recited in claim 11, wherein:
  the full feature set, soft-coded path includes a first set of firmware configured to run on a first embedded processor;
  the reduced feature set, soft-coded path includes a second set of firmware configured to run on a second embedded processor; and
  the hard-coded path includes a semiconductor device, including one or more of the following: an application-specific integrated circuit (ASIC) or a field-programmable gate array (FPGA).

13. The computer program product recited in claim 12, wherein selecting the path includes in the event (1) the full feature set, soft-coded path, (2) the reduced feature set, soft-coded path, and (3) the hard-coded path are enabled:
  in the event the command is an administrative type of command, select the full feature set, soft-coded path;
  in the event the command is an I/O type of command and the length associated with the command is less than a threshold, select the reduced feature set, soft-coded path; and
  in the event the command is an I/O type of command and the length associated with the command is greater than a threshold, select the hard-coded path.

14. The computer program product recited in claim 13, wherein selecting the path includes in the event (1) the full feature set, soft-coded path and (2) the reduced feature set, soft-coded path are enabled and the hard-coded path is not enabled:
  in the event the command is an administrative type of command, select the full feature set, soft-coded path; and
  in the event the command is an I/O type of command, select the reduced feature set, soft-coded path.

* * * * *